E. H. LAMIELL & H. L. HURST.
SPRAYING APPARATUS.
APPLICATION FILED JUNE 11, 1907.
912,966.
Patented Feb. 16, 1909.
3 SHEETS—SHEET 3.
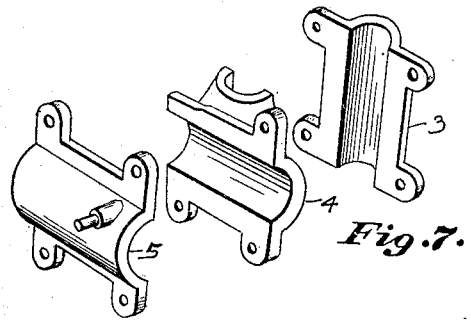
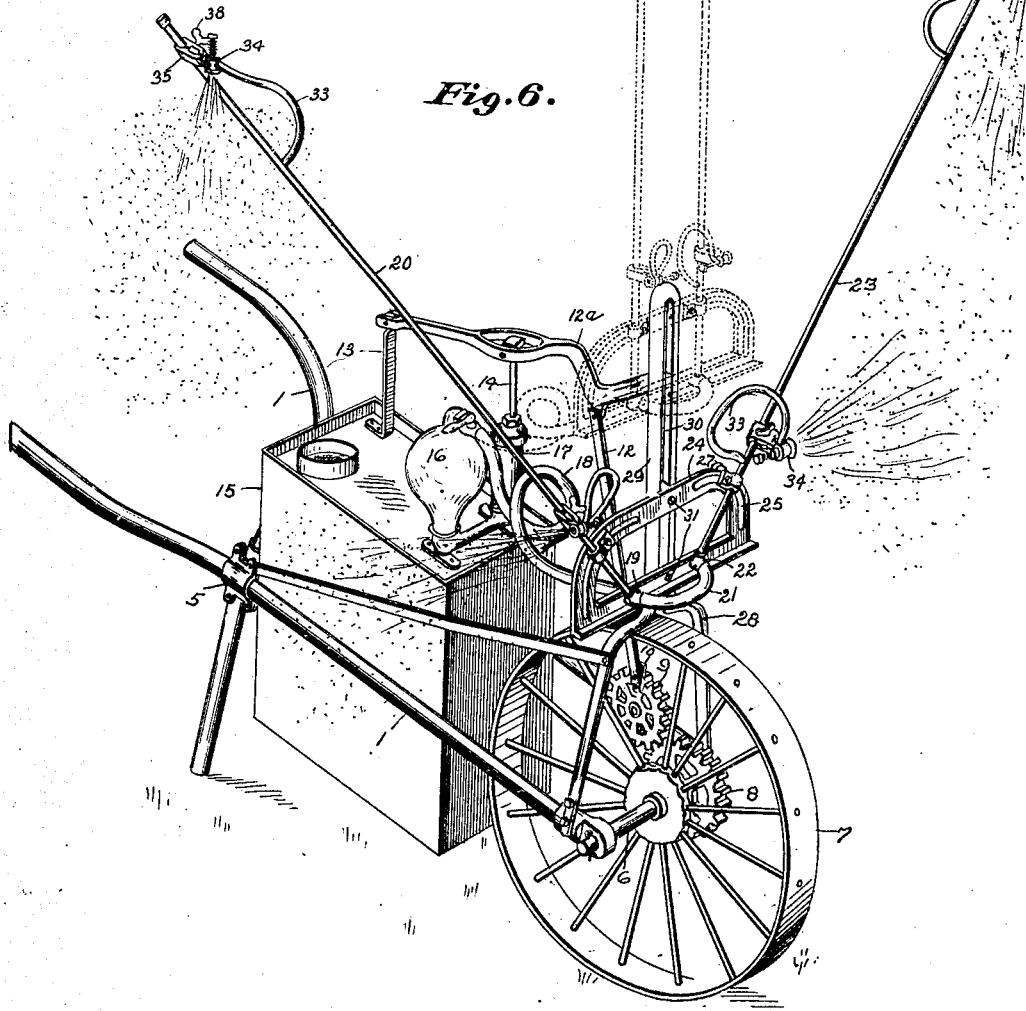

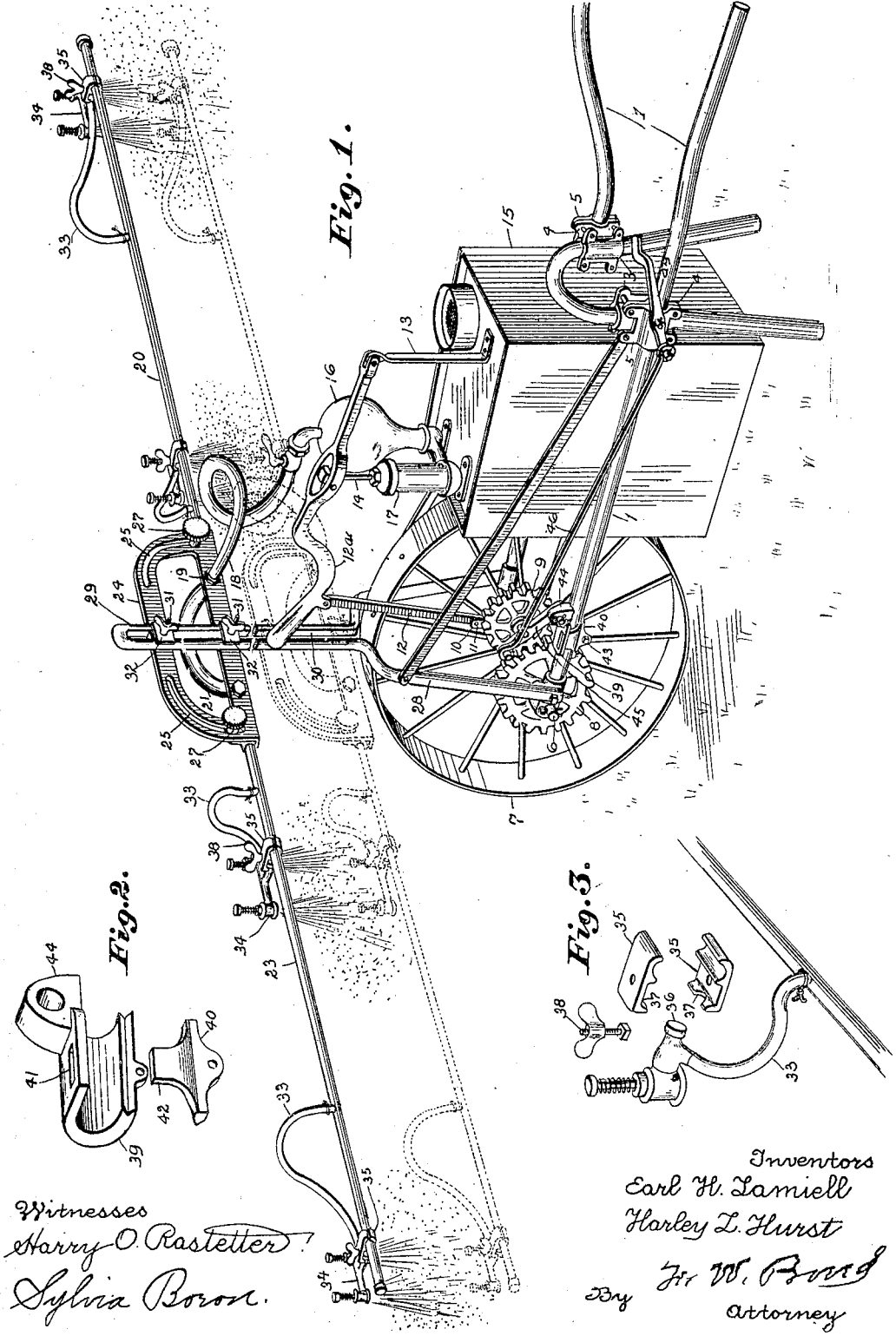

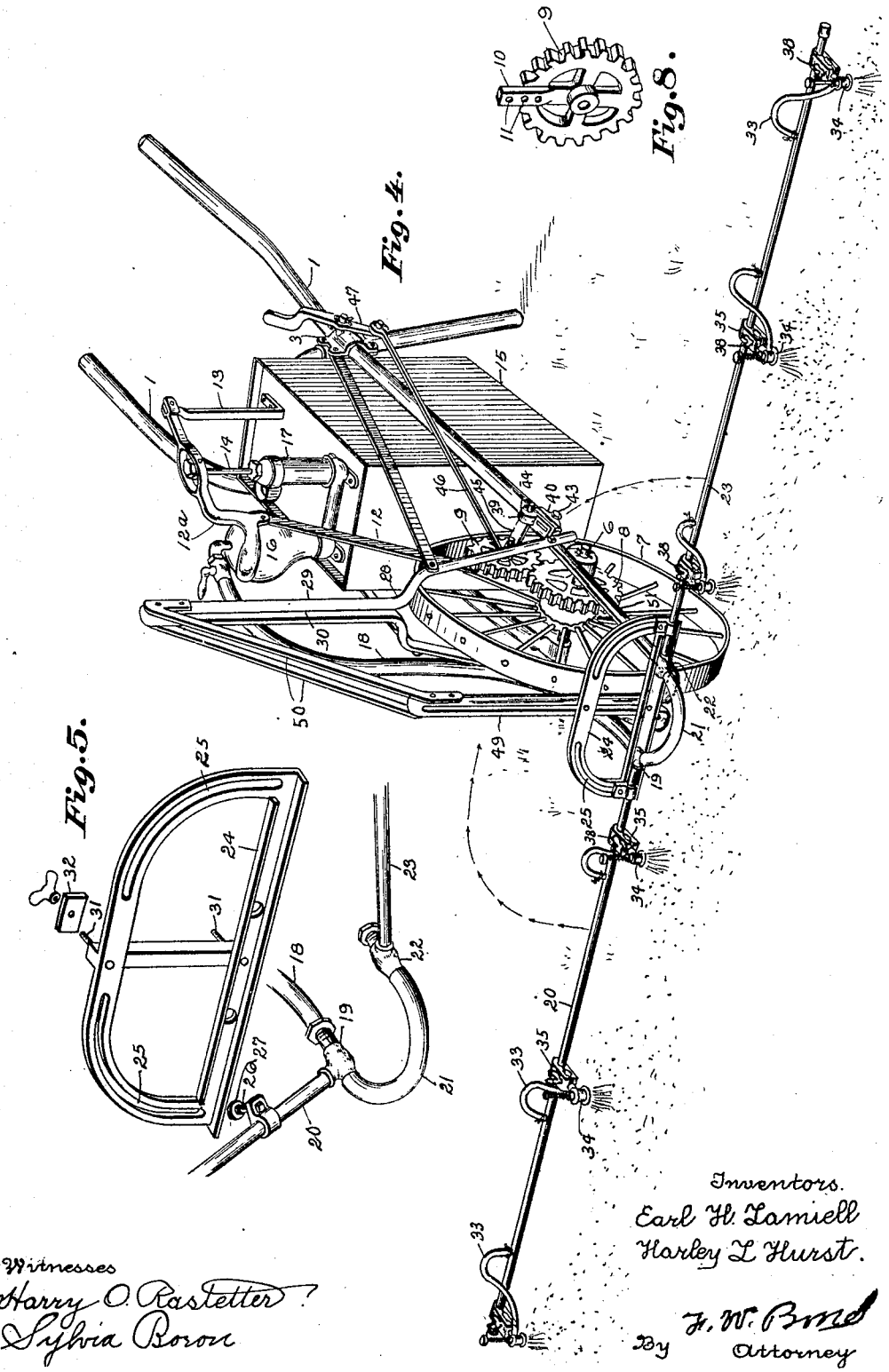

UNITED STATES PATENT OFFICE.

EARL H. LAMIELL AND HARLEY L. HURST, OF CANTON, OHIO, ASSIGNORS TO THE H. L. HURST MANUFACTURING COMPANY, OF CANTON, OHIO, A CORPORATION OF OHIO.

SPRAYING APPARATUS.

No. 912,966.     Specification of Letters Patent.     Patented Feb. 16, 1909.

Application filed June 11, 1907. Serial No. 378,363.

*To all whom it may concern:*

Be it known that we, EARL H. LAMIELL and HARLEY L. HURST, citizens of the United States, residing at Canton, in the county of Stark and State of Ohio, have invented certain new and useful Improvements in Spraying Apparatus; and we do hereby declare that the following is a full, clear, and exact description of the same, reference being had to the annexed drawing, making a part of this specification, and to the numerals of reference marked thereon, in which—

Figure 1 is a perspective view showing the different parts properly arranged and assembled. Fig. 2 is a detached view of the clip and a lever bracket, showing parts of the clip detached. Fig. 3 is a view showing a portion of one of the rigid spraying pipes also showing a flexible hose and nozzle connected thereto and the clip members detached. Fig. 4 is a perspective view showing the rigid spraying bars together with its different attachments and the carrying head in a lowered position. Fig. 5 is a detached view showing the rigid spraying pipe holding head portions of the pipes and their connecting tube. Fig. 6 is a perspective view showing the rigid spraying pipes set at an inclination to a horizontal line. Fig. 7 is a detached view of one of the handle and leg supporting clips showing the members detached. Fig. 8 is a detached view of the pitman gear wheel.

The present invention has relation to spraying machines designed to be moved over the ground and is designed to spray plants and growing vegetables and it consists in the novel arrangement hereinafter described and particularly pointed out in the claims.

Similar numerals of reference indicate corresponding parts in all the figures of the drawing.

In the accompanying drawing, 1 represents the main members of the frame proper, which members are extended rearward and their rear portions constituting suitable handles designed to be grasped by the hands when it is desired to move the sprayer over the ground, which sprayer is moved in substantially the same manner as a wheel-barrow is propelled. For the purpose of supporting the frame together with the different parts carried thereby, the legs 2 are provided, which legs are connected by the clip members 3, 4, and 5, said members being clamped by means of suitable clamping bolts.

To the members of the frame proper is attached the axle 6 upon which axle is mounted the traveling wheel 7. At one side of the traveling wheel 7 is located the gear wheel 8, which gear wheel meshes with the gear wheel 9, which gear wheel 9 is provided with the integral bar 10, which integral bar is provided with a series of apertures 11. The pitman 12 is connected at its bottom or lower end to the gear wheel proper and is extended upward and pivotally connected to the pump lever or handle $12^a$ which lever or handle is pivotally connected to the upright 13 or its equivalent. To the pump handle or lever $12^a$ is connected the pump or piston rod 14. The liquid tank 15 is carried by the frame proper and may be of any desired form.

For the purpose of forcing the liquid into the pressure receptacle 16, the pump 17 is provided, which pump may be of any desired construction and forms no particular part of the present invention so far as its detailed construction is concerned. From the receptacle 16 leads the hose 18, said hose being connected to the T 19, to which T is connected the spray pipe 20. To the T 19 is connected the tube 21, which tube is connected to the T 22 and to the T 22 is connected the spray pipe 23. The T's 19 and 22 are pivotally attached to the head 24 and so connected that they can rock by which arrangement the spray pipes 20 and 23 can be brought into any desired angularity or adjustment.

For the purpose of holding the spray pipes 20 and 23 in fixed adjustment, the head is provided with the slots 25 through which slots the clamping bolts 26 are passed, which clamping bolts engage with the pipe holding heads 27. To the frame 1 is attached the yoke 28, which yoke is provided with the upright extension 29, which extension is provided with the slot 30 through which slot clamping bolts 31 are passed and the head 24 held in fixed adjustment by means of said clamping bolts and the clamping blocks 32.

In use it is desirable and in fact necessary to adjust the spray pipes carrying the spraying nozzles to and from the surface of the ground, owing to the fact that it is of importance that said pipes be so adjusted that they will not interfere with the plants designed to be sprayed. It is also of importance when it is desired to spray plants of considerable height that the spraying pipes 20 and 23 are brought into vertical positions or substantially vertical positions so that they can pass between the rows of plants as the machine is moved over and upon the ground.

To the spraying pipes 20 and 23 are attached in any convenient and well known manner the hose 33. To which hose are attached the spraying nozzles 34, which spraying nozzles may be of any desired kind or style, reference being had to the work designed to be done; that is to say in some instances it may be desired to have a nozzle that will throw a fine spray and in other instances it may be desirable to employ a nozzle that will throw a heavy or unscattered spray.

For the purpose hereinafter described the nozzles 34 are pivotally attached to the clips 35 by means of the head 36 and the recesses 37. The object of pivotally attaching the nozzles is to provide a means for setting the nozzles at any inclination so that they will throw a spray in different directions. The clips 35 are held in fixed adjustment upon the pipes 20 and 23 by means of the clamping bolts 38 and are adapted to rotate upon the pipes when released by the loosening clamping bolts 38 at which time the nozzles can be brought into any desired position or rotated around the pipes 20 and 23 and at the same time they can be moved back and forth upon the pipes 23 and 20, thereby setting the nozzles in the position desired. To one of the frame members are attached the clip sections 39 and 40. The section 39 being provided with a slot 41 and the section 40 provided with the tang 42 adapted to enter the slot 41. These clip sections are held in proper position by means of the clamping bolt 43 or its equivalent. The clip section 39 is provided with the flange 44, to which flange is pivotally attached the rock arm 45, which rock arm carries the gear wheel 9. To the top or upper end of the rock arm 45 is attached the rod 46, which rod extends rearward and is connected to the bottom or lower end of the lever 47, which lever is pivotally attached to the clip member 5 or its equivalent.

It will be understood that when the gear wheels 8 and 9 are in mesh with each other movement will be imparted to the pump lever or handle 12ª by means of the pitman 12, thereby actuating the pump and pumping liquid into the receptacle 16. In some instances it may be desirable to move the sprayer proper without actuating the pump and when this is desired the lever 47 is thrown over its center or its upper end pushed toward the forward end of the machine which brings the gear wheel 9 out of gear with the gear wheel 8 and the sprayer proper moves over the ground without imparting any motion to the parts designed to actuate the pump. In some instances it is desirable to bring the spray pipes together with their different parts in close proximity with the ground and in order to accomplish this the slotted bar 49 is attached by means of the bars 50 and the extended rods 51 connected to the forward ends of the frame members 1 and the head 24 connected to the slotted bar 49 by which arrangement the head together with the different parts carried thereby can be brought into the position illustrated in Fig. 4.

It will be understood that the receptacle 16 constitutes what might be termed a font, and by the action of the pump the desired amount of pressure is brought to force the liquid through the pipes and various nozzles.

Having fully described our invention what we claim as new and desire to secure Letters Patent, is—

1. In a spraying machine the combination of a frame, an axle journaled in the frame, a traveling wheel mounted upon said axle, said axle provided with a gear wheel, a rock arm connected to and carried by the frame, said rock arm provided with a gear wheel adapted to mesh with the gear wheel mounted upon the axle and means for rocking the arm carrying the gear wheel, a pitman actuated by the gear wheel carried by the rock arm, a pump and a pump lever, said pitman adapted to actuate said pump lever, a tank carried by the frame and a receptacle carried by said frame, a yoke connected to the frame, a slotted bar, a head connected to the slotted bar and provided with slots, means for holding the head in fixed adjustment, spray pipes connected to and carried by the head, said spray pipes provided with nozzles and means for connecting the spray pipes and receptacle together, substantially as and for the purpose specified.

2. In a spraying machine of the class described, a traveling frame, a liquid tank, a pump and a liquid receptacle carried by said frame, a slotted member carried by the frame, a head adjustably connected to said slotted member, spray pipes pivotally and adjustably connected to said head, pipes communicating with the receptacle and the pivoted spray pipes, said spray pipes provided with nozzles adjustably attached thereto, substantially as and for the purpose specified.

3. In a spraying machine of the class described, a traveling frame, a liquid tank, a pump and a liquid receptacle carried by said frame, a slotted member carried by the frame, a head adjustably connected to said slotted member, spray pipes pivotally and adjustably connected to said head, pipes communicating with said receptacle and the pivoted spray pipes, said spray pipes being provided with nozzles adjustably attached to the pipe and means for actuating the pump by the movement of the frame, substantially as and for the purpose specified.

In testimony that we claim the above, we have hereunto subscribed our names in the presence of two witnesses.

EARL H. LAMIELL.
HARLEY L. HURST.

Witnesses:
JOHN H. SPONSELL,
F. W. BOND.